United States Patent [19]

Yokokawa et al.

[11] 4,103,815
[45] Aug. 1, 1978

[54] GAS PRESSURE WELDING SYSTEM

[75] Inventors: Takao Yokokawa, Tokyo; Shigeo Takano, Machida; Yasuaki Ichinose, Sayama; Toshiyuki Kasahara, Hino; Fumiaki Ikeda, Nishinomiya, all of Japan

[73] Assignee: Nippon Steel Corporation, Tokyo, Japan

[21] Appl. No.: 765,748

[22] Filed: Feb. 4, 1977

Related U.S. Application Data

[62] Division of Ser. No. 674,558, Apr. 7, 1976.

[30] Foreign Application Priority Data

May 26, 1975 [JP] Japan .................................. 50-62615
Apr. 7, 1975 [JP] Japan .................................. 50-42074

[51] Int. Cl.² ............................................ B23K 19/00
[52] U.S. Cl. .................................. 228/9; 228/44.1 R
[58] Field of Search ...................... 228/9, 44.1 R

[56] References Cited

U.S. PATENT DOCUMENTS

| | | | |
|---|---|---|---|
| 2,231,014 | 2/1941 | Lytle et al. | 228/237 X |
| 2,415,912 | 2/1947 | Scherl | 228/102 |
| 2,988,936 | 6/1961 | Cash | 228/9 |
| 3,462,826 | 8/1969 | Farmer et al. | 228/102 |
| 3,678,566 | 7/1972 | Ellis et al. | 228/102 |

Primary Examiner—Al Lawrence Smith
Assistant Examiner—K. J. Ramsey

[57] ABSTRACT

In an automatic gas pressure welding system wherein a couple of steel members are butted, the butted section is subjected to heating in a pressed state, to thus cause the steel members to be subjected to pressure welding. The pressing and heating periods are connected in conformity with the amount of contraction of the heated section of the steel members.

9 Claims, 13 Drawing Figures

FIG.2

D51: 50.8 m/m$^\phi$

| CONTROL OUTPUT \ STEP \ TIME (SEC) | 1 | 2 | 3 | 4 | 5 | 6 | 7 | 8 | 9 |
|---|---|---|---|---|---|---|---|---|---|
| | 70 | 70 | 30 | 40 | 50 | 10 | 10 | | |
| 1  ACETYLENE  (1) | ▬ | ▬ | | | | | | | |
| 2  ″  (2) | ▬ | ▬ | ▬ | ▬ | ▬ | ▬ | ▬ | | |
| 3  OXYGEN | ▬ | ▬ | ▬ | ▬ | ▬ | ▬ | ▬ | | |
| 4  OIL PUMP | | (CLOSE THE GAP) | | | (FORM A BULGE) | | | | |
| 5  BURNER AMPRITUDE  0 | | ▬ | | | | | | | |
| 6  ″  5 | | | ▬ | | | | | | |
| 7  ″  25 | | | | ▬ | | | | | |
| 8  ″  45 | | | | | ▬ | | | | |
| 9  ″  65 | | | | | | ▬ | ▬ | | |

REDUCING FLAME ← → NEUTRAL FLAME

START ↑   ↑ MANUAL STEPSHIFTING

GAS PRESSURE WELDING SYSTEM

This is a division of application Ser. No. 674,558 filed Apr. 7, 1976.

BACKGROUND OF THE INVENTION

The present invention relates to a gas pressure welding system.

A process of gas pressure welding is extensively applied to joining of such steel members as reinforcing steel bars and rails. In conventional practice, gas pressure welding has been conducted mainly by manual operation. In the case of the conventional practice, the workmanship of an operator constitutes a key factor to influence the quality of a joint. By the automation of the process of pressure welding, the process can be standardized, the quality of a joint can be stabilized, and improvement of the reliability of the joint can be achieved. From such a viewpoint, these inventors have already made proposals with regard to automatic gas pressure welding systems, as disclosed in the patent application No. 126,796-1972 and the patent application No. 27,138-1973, both filed in Japan. In the systems, progress of respective stages of the process is all properly controlled in conformity with a certain timetable preset in a program timer. However, in case the progress of the process is all controlled in conformity with a preset timetable as this, heating is caused to be insufficient in some case due to some external factors, for instance, reduction in flow of gas, the wind, and/or the like. As a result, set time elapses while an interstice is still devoid of being properly joined. In such a case, the interstice thus remaining unjoined between steel members is caused to be subjected to oxidation, thus resulting in defective joining. Besides, to cope with bulge (increase in the diameter) of a joint to be produced by heating and pressing, especially in the case of a reinforcing bar or the like that is put to use in as-weld state after being subjected to pressure welding, the diameter of the bulged joint is required to have a proper size, for instance, 14D - 16D, when the diameter of the reinforcing steel bar is taken as D. However, the degree of expansion is influenced by the temperature of a heated section, distribution of the temperature, and the like. Therefore, in the case of control by preset time alone, the reinforcing steel bar is influenced by external factors, thus resulting in that pressing either falls short or is excessive in some case.

SUMMARY OF THE INVENTION

The object of the present invention is to provide such an automatic gas pressure welding system as enables gas pressure welding to be conducted in a precise manner, with an influence by external factors reduced to the minimum possible level.

In the case of the present invention, conditions of pressure welding can be changed in a proper manner, in conformity with the change in the amount of contraction of the heated section of a steel member. To put it otherwise, the amount of contraction of the joining area of a steel member preferably is automatically detected at a key change-over point of the process, and advance to the subsequent process is effected at the time when the value thus detected reaches the preset amount of contraction. The width of a heated area to the steel member is extended stage by stage in conformity with the change in the amount of contraction.

The pressing process preferably comprises four stages, including a preliminary pressing stage, a primary pressing stage, a secondary pressing stage, and a tertiary pressing stage. (It goes without saying that the process introduced in the present invention is not limited to the said four stages.) Of the said respective pressing stages, the primary pressing stage and the tertiary pressing stage have a condition of pressure welding (for instance, pressing and heating periods) properly controlled in conformity with the change in the amount of contraction of a steel member, meanwhile, the preliminary pressing and the secondary pressing can be so controlled as to be conducted at certain predetermined time. Furthermore, the said stages of the preliminary pressing and the secondary pressing can be so caused as to be of a magnetic recording system. To put it otherwise, a pressure welding process achieved by a skillful operator, is preferably recorded on a magnetic tape, and the magnetic tape is reproduced, to thus obtain a control instruction, then the preliminary pressing and the secondary pressing prosesses are controlled in conformity with the said control instruction.

A system according to one embodiment of the present invention includes a pressing means, a heating means, and a control means. The heating means includes a gas burner and a driving means therefor. The pressing means includes a steel member supporting device and an electromotive oil pump.

In a favorable embodiment of the heating means, an acetylene injection type multiple port ring burner is specifically employed as a burner. The burner is caused to conduct reciprocating motion in the axial direction of a reinforcing bar, and is given rocking motion in the direction rectangular therewith, by means of a driving motor, a belt, and a servo mechanism. The said heating means is to be set in, and off, place in a removable manner on a supporting device en grosse, hence capable of being put to use, irrespective of the posture of a joint. Furthermore, in the case of movement of the joint corresponding to pressing and/or compression, the amount of contraction is detected, and the position of the burner is properly modified in an automatic manner.

In a favorable example of the pressing means, the oil pump generates oil pressure as designated at such time as is designated in a program, in conformity with an instruction given by a control unit. A grip head on the movable side of the supporting device is caused to move by way of a hose and a ram. A reinforcing bar fixed in place thereon is thus subjected to pressing. The supporting device is provided with a couple of grip heads, whereof one is properly fixed in place. The grip head on the movable side has a searching rod for detecting the change therein properly connected therewith, thereby the amount of contraction is transmitted to the control mechanism.

The control unit has, desirably, sequence control by a designated program and feedback control by the amount of contraction of the joint of reinforcing bars employed jointly therefor. Control is conducted with regard to the amplitude (heating width) in respective processes of the burner, working and suspension of an oil pump, opening and closing of an injection acetylene valve, other operating time, and the time period of each process.

BRIEF DESCRIPTION OF THE DRAWINGS

FIG. 2 is a time-controlled pressure welding flow sheet;

DETAILED DESCRIPTION OF PREFERRED EMBODIMENTS

Figure 1:
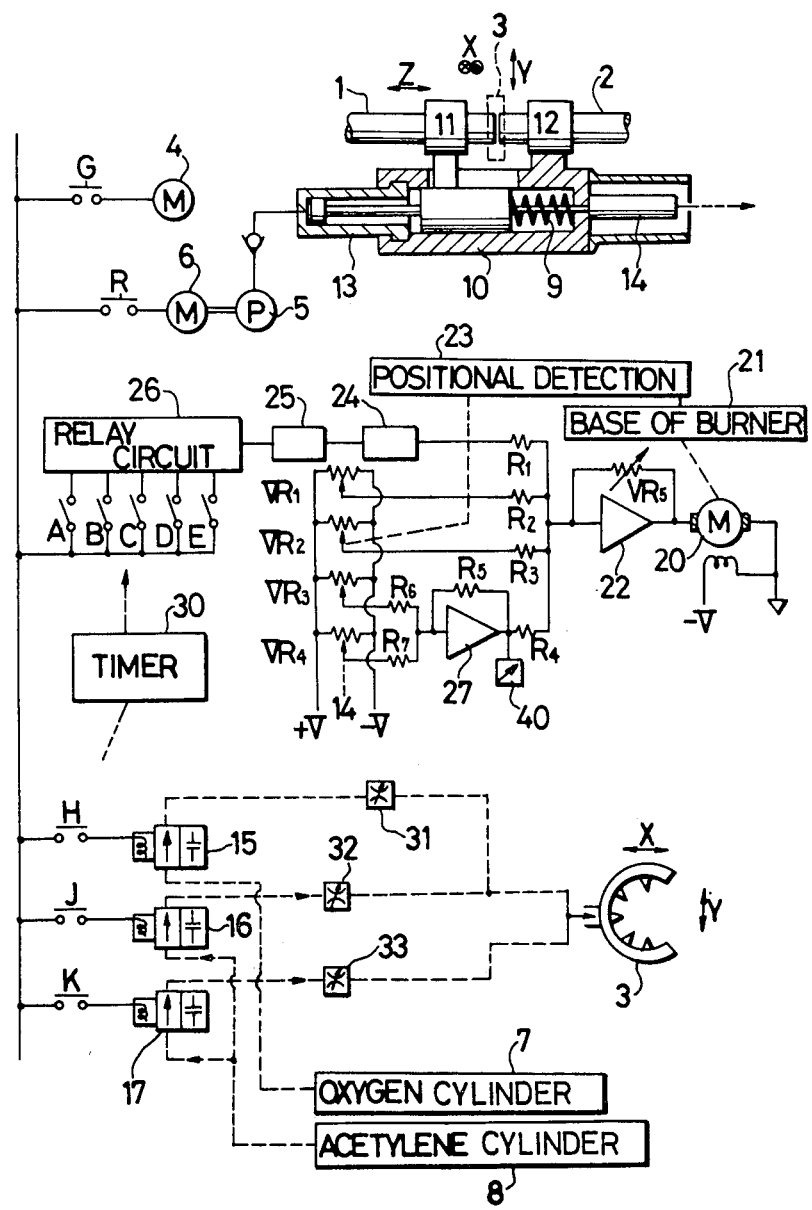
FIG. 1 is a diagram of key portions of a gas pressure welding device.

Shown in FIG. 1 are key portions of the automatic gas pressure welding apparatus introduced in the present invention. 1 and 2 represent steel members to be subjected to pressure welding. A steel member supporting device 10 holds steel members 1, 2 firmly enough by means of chucks 11, 12. A ram 13 fitted in place on one end of the steel member supporting device presses the movable chuck 11 against the fixed chuck 12. A ram position detector 14 has the stator thereof fitted in place on the steel member supporting device 10, and has the movable part thereof fitted in place on the movable chuck, respectively. Numeral 9 represents a return spring. A motor 4 puts a burner 3 to reciprocating motion concurrently in the both directions of X and Y (thus into rotary motion), and the whole periphery of the butt-jointed section of the steel members 1, 2 is thereby heated. A pump 5 is driven by a motor 6, and feeds a ram 13 with pressurized oil. An oxygen gas source 7 and an acetylene gas source 8 feed the burner 3 with a required quantity of each gas by way of gas switches 15 - 17 and flow control valves 31 - 33. A driving motor 20 set on the base 21 of the burner 3 is energized by the output of an amplifier 22, and puts the gas burner 3 to reciprocating motion in the direction of the z axis along the steel members. A position detector 23 is fitted in place on the base 21 of the burner, and conducts control of the rocking arm of a variable resistor $VR_2$. $VR_1$, $VR_3$, $VR_4$ and $VR_5$ represent other variable resistors. $R_1 - R_7$ represent resistors. Numeral 24 represents a frequency oscillator; 25 represents an amplitude and velocity setter; 26 represents a relay circuit, and 27 represents an amplifier constituting an adder. A program timer 30 subjects the relay circuit 26 and the contacts A - E, G, H, J, K inserted in gas switches 15 - 17 proper control true to a program.

A brief description of the operation for the gas pressure welding by the employment of this apparatus will be given below. To start with, the steel members 1, 2 to be subjected to pressure welding are fitted in place on the steel member supporting device 10, and in the wake thereof the gas burner 3 is caused to move in a manner of encircling the butt-joined section of the steel members. The motor, the amplifier, and the variable resistors $VR_1 - VR_4$ constitute a servo mechanism for controlling the movement of the burner 3 in the direction of the Z axis. The variable resistor $VR_1$ for setting the position of the burner is properly adjusted in such a manner that the burner 3 is positioned on the butt-joined surface of the steel members 1, 2. This setting motion can be conducted in a precise manner through proper feedback control by the gas burner position detector 23 and the variable resistor $VR_2$. The variable resistor $VR_4$ is controlled by a ram position detector 14. The variable resistor $VR_3$ is for setting the position of the ram. These variable resistors are so designed as to modify the position of the burner 13, to thus keep the burner to be always on the butt-joined portion of the steel members 1, 2 in a correct manner, by modifying the position of the burner 3 in correspondence to that the steel members are pressed forcefully by the ram 13 and thereby subjected to compression. At the initial stage, the variable resistor $VR_3$ is controlled in such a manner that the output of the amplifier 27 is reduced to zero. In such a stage as this, the contacts H, J, and K are caused to be closed by a signal from an external source. Thereby, the gas burner is caused to be ignited.

In the wake thereof, when the timer closes the contacts G, R, A - E in a sequential manner, the burner 3 is put to rotation, and the butt-joined section of the steel members is heated for the designated period of time. The motor 6 is started up, to thus feed the ram with pressurized oil. The steel members 1, 2 are pressed forcefully, to thus cause the portions to be butt-joined to be properly joined with each other, and to be subjected to rocking by as much as the designated width on the right and on the left, with the butt-joined section of the steel members selected as the center thereof, in the direction of the Z axis as well. The amplitude and the velocity of the said rocking are determined by the amplitude and the frequency of a signal wave generated by the frequency oscillator 24, several kinds of the said amplitudes and the said frequencies are preset in an amplitude and velocity setter 25. Either one thereof is properly selected by a relay circuit 26 at the time the contacts A - E are closed. At around the time when the designated width with the butt-joined portion of the steel members selected as the center thereof reaches the level of desired temperature, the ram 13 is put in forceful actuation, to thus compress the steel members 1, 2. A bulge is caused to be formed at the butt-joined portion. The burner 3 is caused to have the rocking thereof suspended.

The said heating of the steel members and the mode of pressing have a variety of modifications. For instance, pressing of the steel members by the ram 13 includes the one wherein pressing force is kept constant during the period of pressure welding, and the one wherein pressing force is subjected to change.

Now, the gas pressure welding of steel members is a sort of solid phase welding. Whether or not welding is conducted in a satisfactory manner is influenced by such factors as temperature, pressure, degree of deformation on the joining surface, degree of oxidation, and the like. Therefore, in the case of conducting automatic pressure welding, such multifarious factors as are associated therewith are all required to be taken into account. However, when changes in those factors are fixed, the pressure welding process can be properly controlled in conformity with the running hours of the respective stages. To put it otherwise, when the flow of a heating gas and the heating width expansion schedule are constant, the level of temperature and the distribution of temperature in a heated portion become virtually constant. Furthermore, when the maximum pressure for pressing and the pressing schedule are determined, the degree of the bulge of the joint, and the amount of contraction thereof, are virtually determined. This is the basic principle of control of automatic pressure welding in terms of time, and, in the case of conducting pressure welding in conformity with a constant schedule as this, the amount of contraction and the process are well corresponding to the lapse of time in the pressure welding process. Shown in the table given below is the relation between the features of the respective stages of the process and the amount of contraction.

| Classification of process | Purpose and key points of process | Pressing force | Amount of contraction |
| --- | --- | --- | --- |
| Period of preliminary pressing | Rise in temperature and softening of butt-joined portion of steel member Maintenance of non-oxidizing heating atmosphere | Gradual decrease | Moderate |
| Period of primary pressing | Joining of initial butting gap No gap allowed to be left | Retaining of maximum set pressure | Initial gap + α |
| Period of secondary pressing | Expansion and rise in temperature of heated zone Rise in temperature up to pressure welding temperature and softening | Gradual decrease | Moderate |
| Period of tertiary pressing | Completion of bonding and formation of bulge Diameter of bulge = 14D - 16D | Rise up to maximum set pressure | High (corresponding to designated bulge) |

The method of controlling the pressure welding process like this by the factor of time takes it as a premise that a certain interrelation is present between pressing and heating time on the one hand and heating temperature and the amount of contraction on the other hand. However, in case the said interrelation is subjected to considerable fluctuations by such an external factor as cannot be controlled, for instance, atmospheric temperature, wind, rain, or the like, time control is impracticable. Now that the amount of contraction of a pressure welded steel member, on the part thereof, is what is produced as a result of heating and pressing, more direct control than the time control can be conducted by detecting the said amount of contraction and taking it as an indication value. To put it otherwise, in the period of the primary pressing shown in the table given above, joining of a gap can be guaranteed by causing this stage to continue until the amount of contraction becomes equivalent to, or at least slightly larger than, the initial gap, and, in the period of the tertiary pressing, a designated level of the bulge can be guaranteed by causing the pressing to continue until such amount of contraction as is corresponding to the designated level of the bulge is produced. Furthermore, now that the resistance to deformation of steel is in favorable interrelation with heating temperature under a certain condition, the amount of contraction becomes an indication of heating temperature. For such a reason as this, control of the pressure welding process by the amount of contraction is less influenced by external factors than in the case of the indirect time control method, and can be said to be a more secure method of process control.

The table given above is what shows the case wherein the process can be classified into the primary, the secondary and the tertiary stages of pressing. Additionally, it is possible to use a constant pressing method wherein a certain range of pressure is applied at all time, as set forth above. In this case as well, the amount of contraction increases gradually. Therefore, comparative set values of the amount of contraction at respective stages are found experimentally. Thereby the same control can be conducted. It goes without saying that, beside controlling the whole process by the amount of contraction, time control is partially adopted, and the both may be employed jointly for the control of the whole process.

Shown in FIG. 2 is a diagram of another embodiment of the automatic pressure welding process by time control of a deformed bar D51 (50.8mm in nominal diameter). Acetylene (1) and acetylene (2) are fed to respective nozzles through separate flow channels. The former so keeps the heating atmosphere as to be a reducing atmosphere, and is injected into the heating atmosphere independently, for the purpose of preventing the joining surface from being subjected to oxidation. The latter is aimed to conduct heating, and mixed with oxygen for combustion. An oil pump 5 is put to actuation in the third, the seventh and the eighth processes in the example shown in FIG. 2. In the case of being actuated in the third process, the oil pump 5 is what joins the initial gap. In the case of being actuated in the seventh and the eighth processes, the oil pump 5 is what forms a bulge. The amplitude of the burner 3 for the reciprocating motion along the direction of the z axis is set for five stages of 0 mm, 5 mm, 25 mm, 45 mm and 65 mm, respectively, which are applied in the second, third, fourth, fifth, sixth and seventh processes, respectively.

Figure 3:
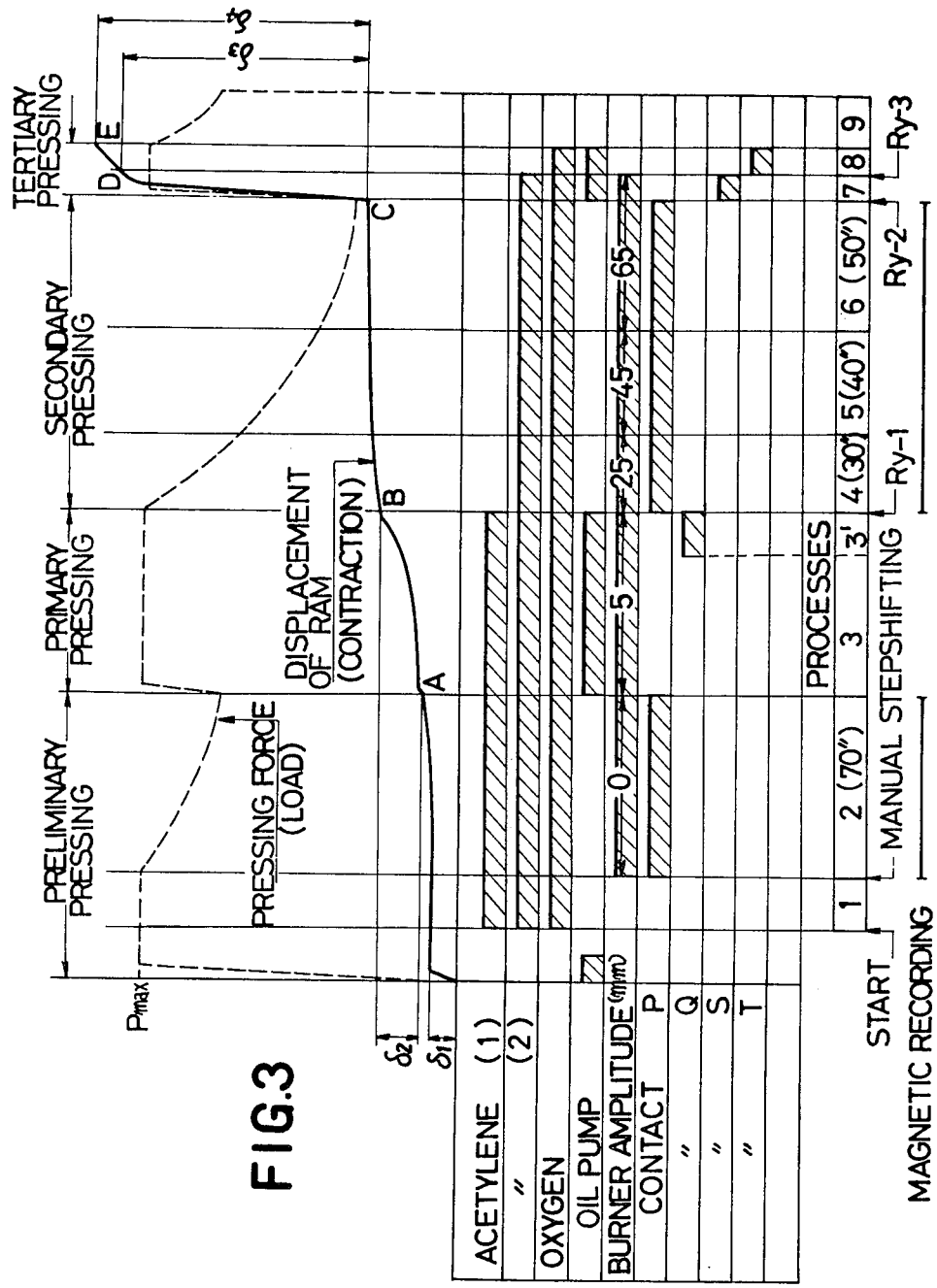
FIG. 3 is a flow sheet and a pressing curve diagram prepared to show an embodiment of the present invention.

Shown in FIG. 3 is an illustration of the present invention wherein control by the amount of contraction, i.e., allowance for bulge, is employed jointly with the time control system shown in FIG. 2. Allowance for contraction of the joining portion of the steel members is detected by an oil pressure ram position detector 14 connected with the movable chuck 11 of the steel member supporting device 10.

Figure 4:
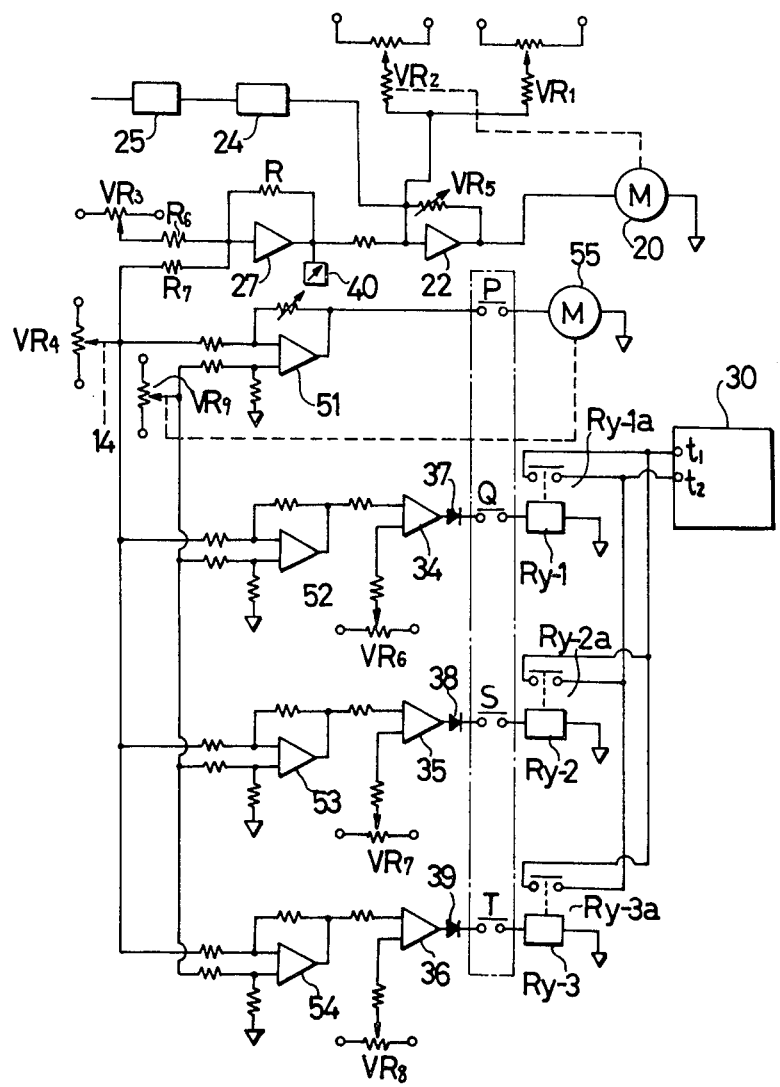
FIG. 4 is a connection diagram of a circuit for giving a control instruction in conformity with the amount of contraction.

Shown in FIG. 4 is a key portion of such a circuit as is designed to conduct the process control by the amount of contraction. The motor 20, the amplifiers 22, 27, and the variable resistors $VR_1$ - $VR_5$ are all the same as those shown in FIG. 1. A part of the circuit is omitted for simplification. Referring to FIG. 4, 51 amplifies the balance between the output voltage of the potentiometer $VR_4$ for detecting the ram position and the voltage of the servo potentiometer $VR_9$, and puts in revolution such a servo motor 55 as is connected with the slider of $VR_9$. Ry-1, Ry-2 and Ry-3 are relays, which are connected with the output terminals of the amplifiers 34, 35, 36 constituting a comparator, by way of the diodes 37, 38, 39 and the contacts Q, S, T of the program timer 30, respectively. $VR_6$ - $VR_8$ are variable resistors, which are employed for setting the standard values $\delta_2$, $\delta_3$, $\delta_4$ of the amount of contraction. Numerals 52 - 54 are also amplifiers, whereof the input terminals on one side are connected with such an output terminal (slider) of the variable resistor $VR_4$ as is controlled by the ram position detector 14. The input terminals on the other side are connected with the output terminal of the servo potentiometer $VR_9$. Now that, in this case, while the contact P of the program timer is kept closed, the servo motor 55 is so actuated as to keep the both input to the amplifier 51 equivalent at all time. The output voltage of the potentiometer $VR_4$ for detecting the ram position and the output voltage of the servo potentiometer $VR_9$ are equivalent at all time. The contacts Ry-1a - 3a of the relays Ry-1 - Ry-3 are connected with the process advancing terminals $t_1$, $t_2$ of the program timer 30. When these contacts are closed, the pressure welding process can advance to the subsequent process.

Next, the pressure welding process involved in the present invention will be described below, by making reference to FIGS. 1, 3 and 4. First, the reinforcing steel bars 1, 2 are set in place on the supporting device 10. The oil pump 5 is put to actuation by a manual operation button R, to thus either conduct preliminary pressing on the reinforcing steel bars on cause the pressing force to rise up to the maximum set pressure Pmax of the oil pump. The slide $\delta_1$ at the clamping points 11, 12 of the steel member supporting device 10 is caused to be produced at this time, to thus bring about a state wherein no more slide is produced. The variable resistor $VR_3$ is operated, to thus cause a voltmeter 40 to indicate 0. To put it otherwise, the output of the amplifier 27 is reduced to the level of 0. In the wake thereof, the startup button is pushed to thus put the program timer 30 to actuation, and the valves 15 - 17 of the acetylene and oxygen feeders. Then, the burner 3 is ignited and inserted in place to the heating position. The manual button for advance of the process is set at the position of ON. Now, the burner 3 starts its motion in conformity with a prepared program. Concurrently, in the second process, the contact P is turned on. Then, the motor 20 is caused to remain in the state of actuation until the balance of the output voltage between the variable resistors $VR_4$ and $VR_9$. To put it otherwise, the output of the variable resistor $VR_2$ is kept equivalent to the output of the variable resistor $VR_4$ at all time, while the contact P is set at the position of On.

Now that the secondary process has time properly set, when the time thus set is reached, advance to the tertiary process is effected. The amplitude of the burner becomes 5 mm. The contact P is concurrently set at the position of OFF. And, the variable resistor $VR_9$ comes no more to follow the variable resistor $VR_4$. To put it otherwise, the output voltage of the variable resistor $VR_4$ at the point A shown in FIG. 3 is thus kept in memory. The value becomes the original point of the position of the ram in the tertiary process. In the tertiary process, the pump 5 is actuated, to thus cause the oil pressure to rise, the joining portion of the reinforcing steel bars is pressed. The output of the comparator 34 is reversed when the amount of contraction of the said joining portion of the reinforcing bars reaches the level of $\delta_2$. The relay Ry-1 is energized in the process 3', to thus close the contact Ry-1a thereof. A process advance signal is given to the program timer through the contact Q which is closed in the process 3', advancing of the process to the subsequent fourth process. To put it otherwise, the matter that the joining portion is completely joined is confirmed by the amount of contraction of the joining portion. The contact K is opened, to thus cut off the flow of acetylene (1). A reducing flame is changed over to a high-temperature neutral flame.

The fourth, the fifth and the sixth processes advance on the basis of time. The contact P is closed again, and the contact Q is opened. Upon completion of the sixth process, the contact P is opened, and the contact S is closed. The variable resistor $VR_9$ keeps in memory the position of the ram at the point C. Advance to the seventh process is effected. In the seventh process, the oil pump is actuated. The joining portion of the reinforcing steel bars is subjected to pressing again, to be thus subjected to contraction. This forms a comparatively large bulge on the joining portion. When the amount of contraction reaches the level of the set value of $\delta_3$, the output of the comparator 35 is reversed. A process advance signal is given to the program timer 30 by way of the relay Ry-2. The seventh process is thus completed. The contact S is cut off, and the contact J is opened, to thus cause the feed of acetylene (2) to be suspended. The burner 3 is extinguished, and advance to the eight process is effected. In the eighth process, the contact T is closed. The comparator 36 has its output reversed when the amount of contraction likewise reaches the level of $\delta_4$. A process advance signal is given by way of the relay Ry-3, to thus effect the advance to the ninth process. The contact T is cut off. Now that the ninth process is set on the basis of time, when the set time is reached, oil pressure is released. All the processes of pressure welding are thus completed.

In the seventh and eighth processes, now that the servo system is actuated, to thus cause the point C shown in FIG. 3 to become the original point of the position of the ram, as set forth above, the bulge of the joining portion can be always kept to be of virtually the same size, by removing fluctuations in the amount of contraction attributable to the degree of the initial gap and the irregularities of the buttend surface of the reinforcing steel bars.

By the way, in the case of this illustrated embodiment, time control is jointly employed in the fourth, fifth and sixth processes. However, it is due to that, in the pressing system introduced herein, the amount of contraction in these processes is only small, and fluctuations therein are also negligible. Therefore, in case the amount of contraction in the said processes is rather large, when other pressing system is followed, it is likewise practicable to conduct proper control of all the processes including the tertiary one through the eighth one by taking the amount of contraction as a guide thereto.

Now, in the case of the embodiment described above, the preliminary pressing and the secondary pressing are conducted with a certain length of time specifically preset therefor, as shown in FIG. 3. However, in the case of the embodiment described below, a magnetic recording system is adopted for the said preliminary pressing and the said secondary pressing, for the purpose of all the more improving the precision of pressure welding. In the magnetic recording system thus adopted, the pressure welding processes effectuated by skillful operators are recorded on a magnetic tape. Control instructions are obtained by reproducing the magnetic tape. Gas pressure welding is subjected to automatic control on the basis of the control instructions thus obtained. Preferably, cassette tapes are employed. Respective pressure welding processes effectuated by skillful operators under multifarious conditions are kept recorded on the said tapes, whereby well through-out and scrupulous control to cope with the sizes of the steel members to be subjected to pressure welding, the classification thereof, the atmospheric conditions, and the situation of the job site can be made conductible in a simple and satisfactory manner.

Figure 5:
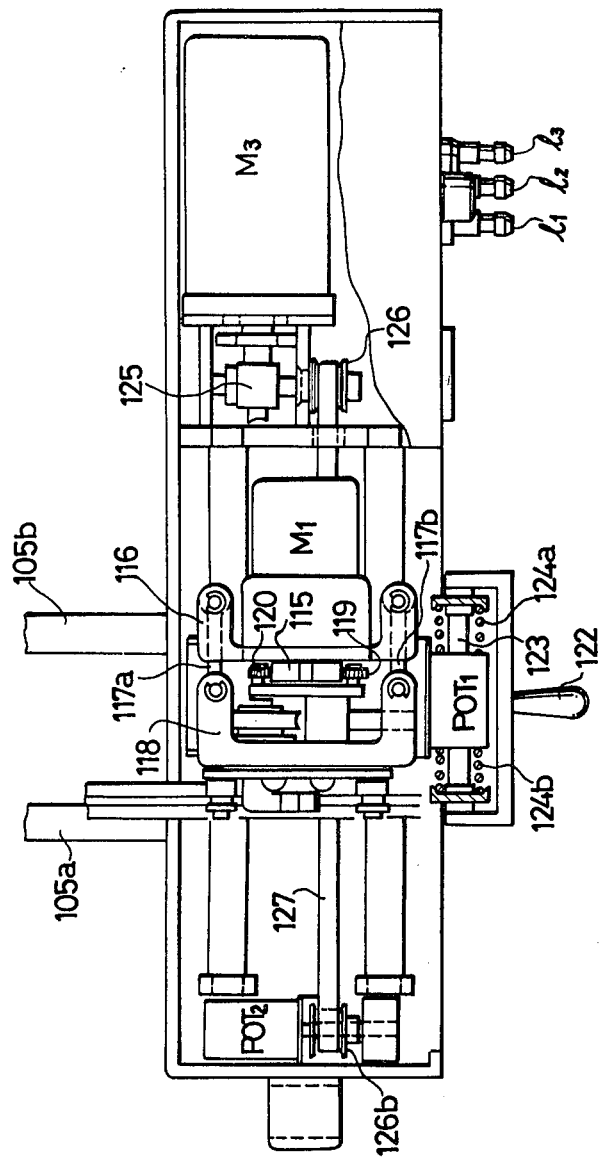
FIG. 5 is a plan of the driving section for the burner.
Figure 6:
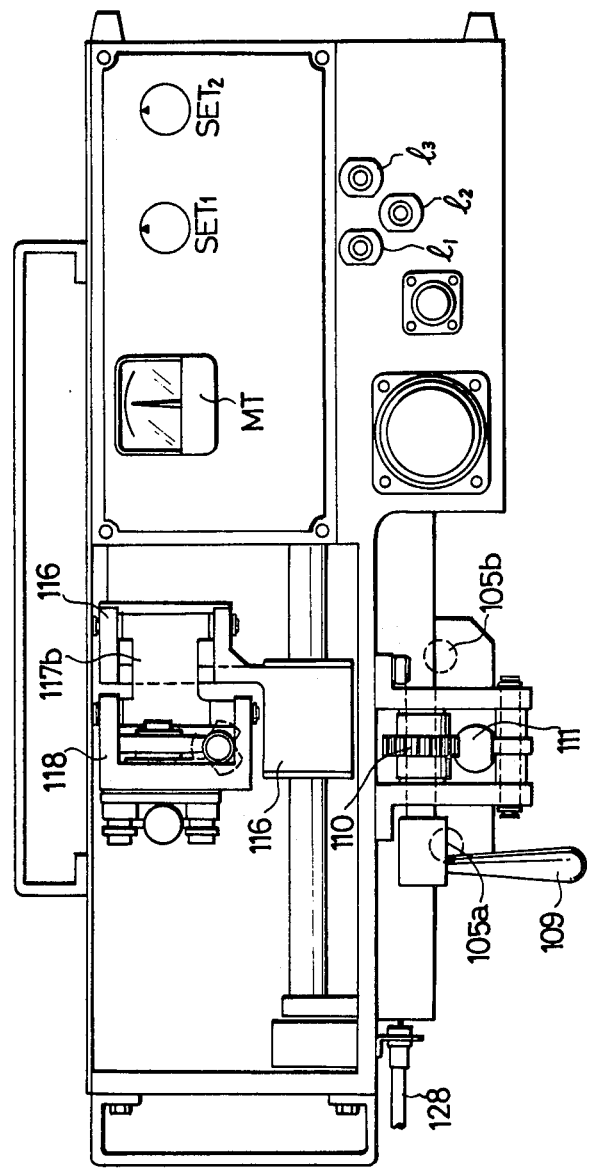
FIG. 6 is a side view thereof.
Figure 7:
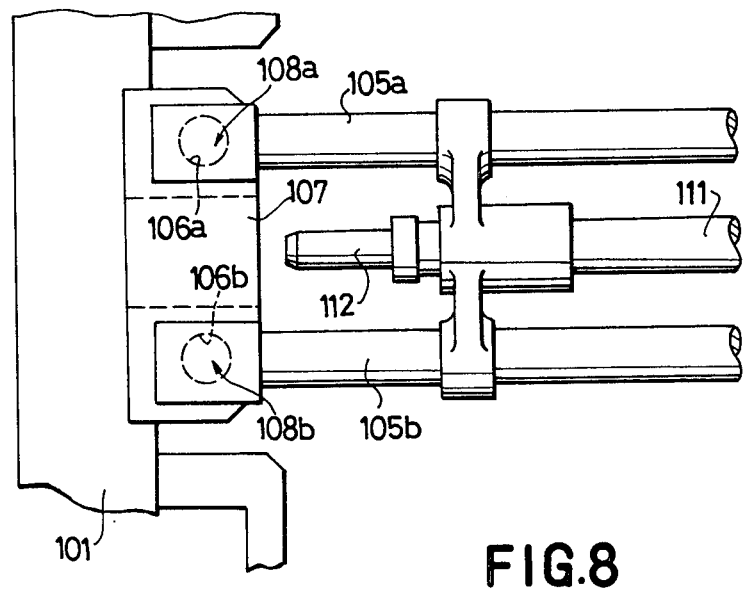
FIG. 7 through FIG. 9 are a plan and side views of a part thereof.
Figure 8:
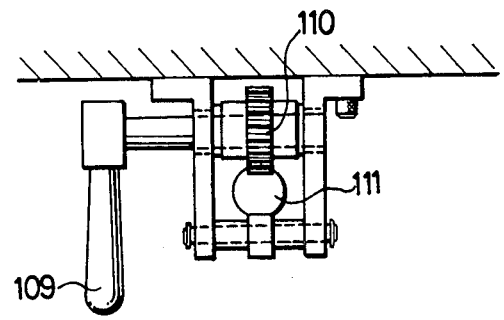
Figure 10:
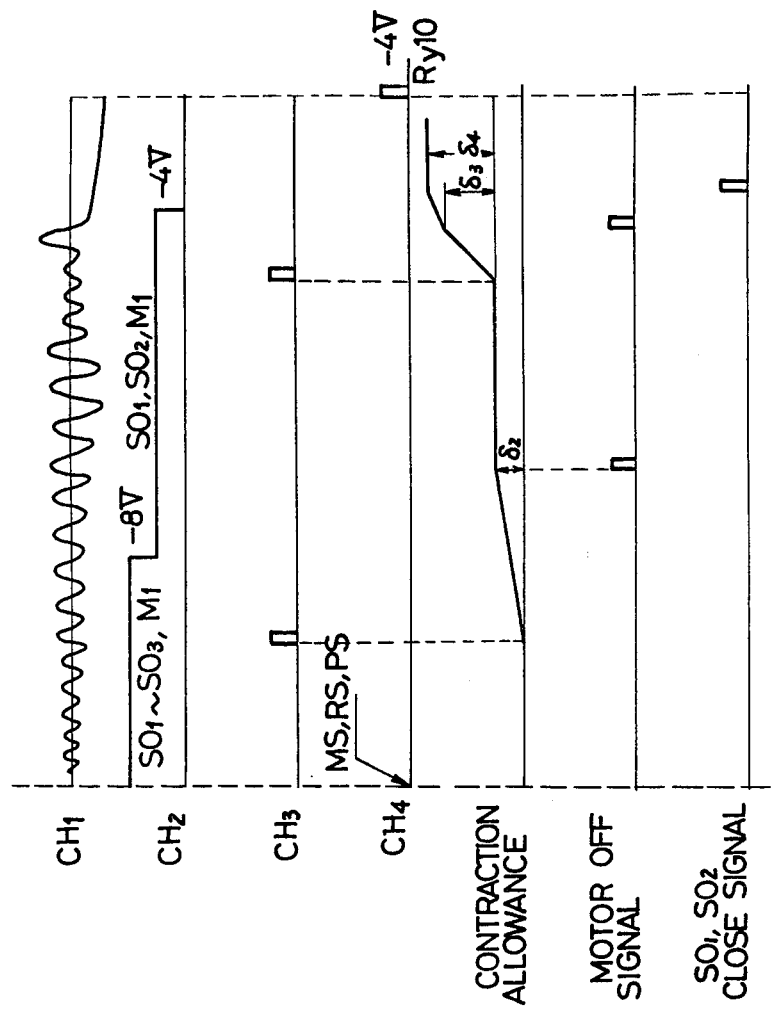
FIG. 10 is a waveform diagram showing an example of a recording signal to a data recorder.
Figure 11:
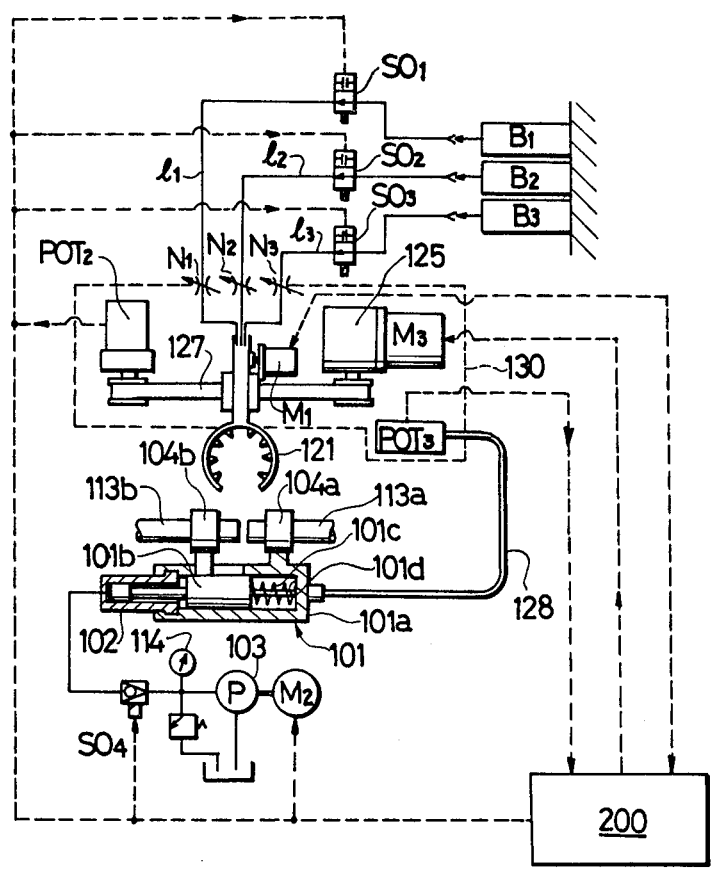
FIG. 11 is a diagram of the entire constitution of the system according to the present invention.
Figure 12:
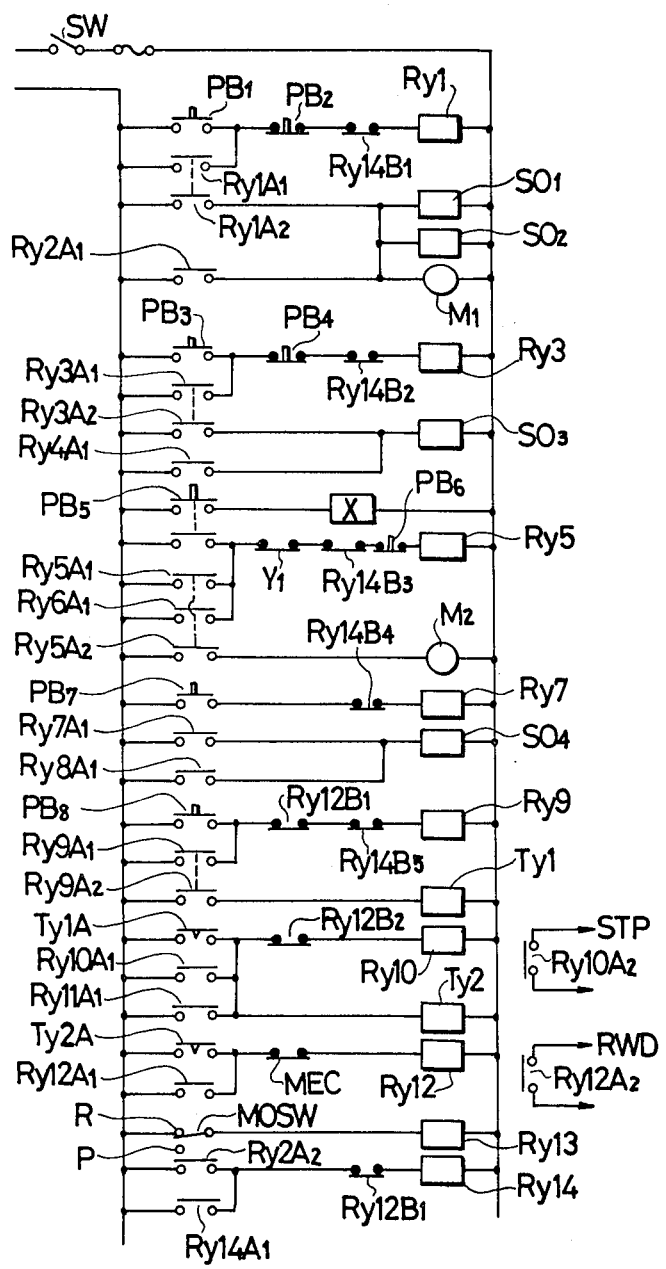
FIG. 12 and FIG. 13 are control circuit diagrams therefor.
Figure 13:
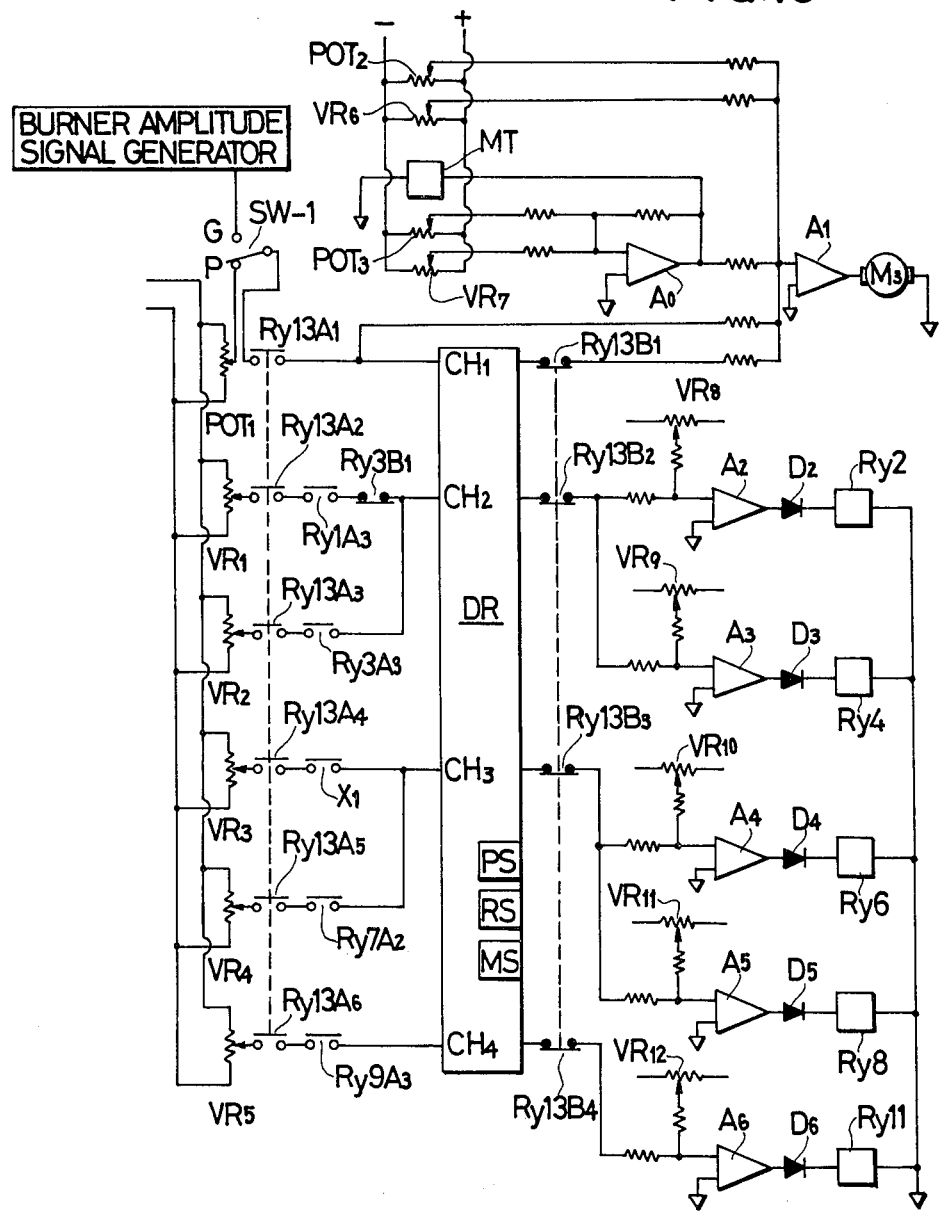

FIG. 5 is a plan of the burner driving section of the gas pressure welding apparatus. FIG. 6 is a side view thereof. A part of the cover is deleted in these drawings. Shown in FIG. 7 is a connecting portion between the reinforcing steel bar supporting device and the burner driving mechanism. Shown in FIG. 8 is the rack shaft feeder thereof specifically closed up. Shown in FIG. 10 are signal waveforms to be recorded on the respective channels of the data recorder. FIG. 11 is a block diagram showing the outline of the key portions of the gas pressure welding system. The automatic gas pressure welding system of this category is described in details in the patent application No. 126,796-1972 and the patent application No. 27,138-1973, both filed in Japan. FIG. 12 and FIG. 13 are control circuit diagrams. By making reference to the said drawings, and with emphasis placed specifically on FIG. 11, given below will be a description of the outline of the construction and the operation of the gas pressure welding system introduced herein.

Shown in FIG. 11, with the symbol of 200 attached thereto, is a control means specifically designed for controlling the actuation of respective sections of this sytem. A hollow external cabinet 101a of the reinforcing steel bar supporting device 101 has a movable piece 101b arranged in place therein in a manner of being free to slide. The said movable piece 101b has a movable chuck 104b fitted thereon. The hollow external cabinet 101a has a fixed chuck fixed in place thereon. The hollow external cabinet 101a has an oil pressure ram 102 fitted in place on one end thereof.

The oil pressure ram 102 is of such a mechanism as is capable of pressing one end of the movable piece 101b. The movable piece 101b has a spring 101c fitted in place on the other end thereof. The spring 101c is kept pressed against the side of the oil pressure ram at all time. A detecting bar 101d senses out the movement of the movable piece 101b, hence the movable piece 101b is connected with a potentiometer $POT_3$ by way of a wire cable 128. An oil pressure pump 103 is driven by a motor $M_2$, and feeds the oil pressure ram 102 with pressure oil by way of an electromagnetic check valve $SO_4$ for release of oil pressure. The reinforcing steel bars 113a, 113b to be subjected to joining are held in place by a fixed chuck 104a and a movable chuck 104b, and subjected to pressure welding in the state of having the butt ends thereof properly butted.

Figure 9:
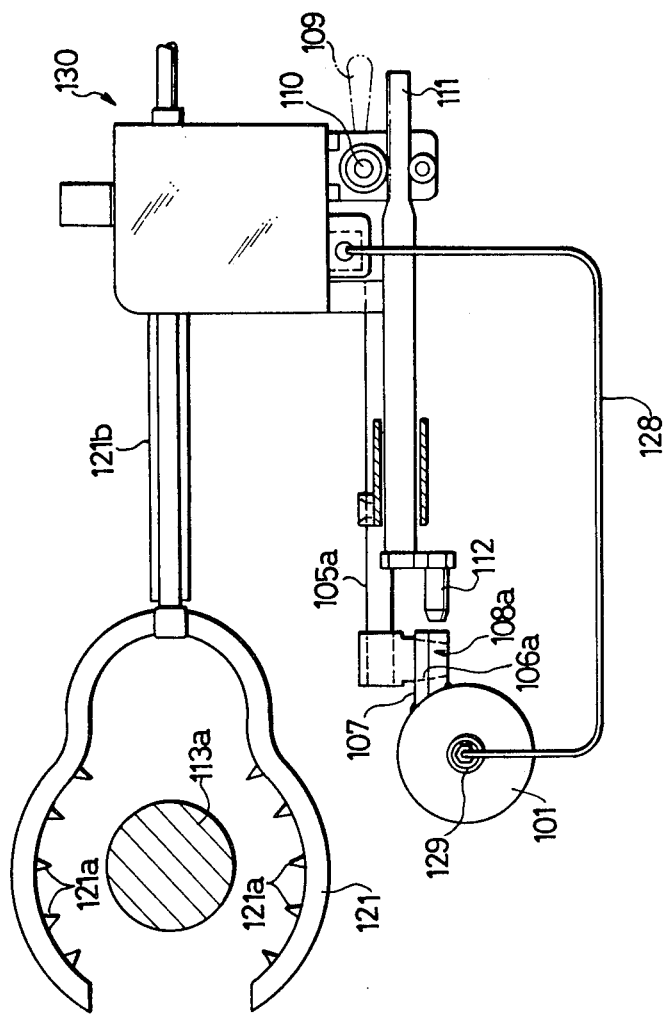

The gas burner 121, on the part thereof, encompasses the butted section of the reinforcing steel bars, and reciprocates in the axial direction of the burner, while reciprocating in the axial direction of the reinforcing steel bars, wherever so required, in the course whereof conducts heating of the said butted section. Suppose the longer direction of the reinforcing steel bars to be the X axis, and the coordinate axis of the butt end surface of the reinforcing steel bars intersecting therewith at right angles to be the Y axis, the said encompassing movement is given by a reciprocating motion in the direction of the Y aixs, while the said reciprocating motion is given by a reciprocating motion along the direction of the X axis, whereby the whole periphery of the butted section of the reinforcing steel bars are uniformly heated in a proper manner. The burner 121 is shown in FIG. 9 in an enlarged form. A plurality of nozzles 121a for injecting a gas and the supporting shafts 121b therefor, are driven by a burner driving mechanism 130, to thus conduct reciprocating motion in the longitudinal and horizontal directions.

The burner driving mechanism 130 is provided with a burner rocking motor $M_1$ and a burner driving motor $M_3$. The former puts the burner to reciprocating motion in the axial direction thereof, while the latter puts the burner to reciprocating motion in the axial direction of the reinforcing steel bars by way of a timing belt 127. The said burner 121 is connected with an oxygen cylinder $B_1$ and acetylene cylinders $B_2$, $B_3$, by way of pipelines $l_1$, $l_2$ and $l_3$. The said pipelines have an electro-magnetic valve $SO_1$ for oxygen for heating, an electro-magnetic valve $SO_2$ for acetylene gas for heating, an electro-magnetic valve $SO_3$ for acetylene gas for reduction, and a plurality of throttle valves $N_1$, $N_2$, $N_3$ properly arranged in place thereon. The rotating shaft of the burner rocking motor $M_1$ has an eccentric cam 115 properly fitted in place thereon, as shown in FIG. 5 and FIG. 6. The said eccentric cam 115 has miniature rolls 119, 120 come in contact therewith. When the motor $M_1$ is put in revolution, a rocking piece 118 having the said miniature rolls 119, 120 fitted in place thereon is put to reciprocating motion in the axial direction of the burner. The said rocking piece 118 has the burner 121 properly fitted in place thereon. Furthermore, the said rocking piece 118 is supported by double connecting bars 117a, 117b. Besides, the rotating shaft of the burner driving motor $M_3$ has a reduction gear 125 fitted in place thereon. The said reduction gear 125 has a pulley 126a fixed in place on the output shaft thereof. A timing belt 127 is set in place in a tensile manner between the said pulley 126a and another pulley 126b set in place at the other end. The said timing belt 127 has a slide block 116 fixed in place thereon. And the slider of the potentiometer $POT_2$ is connected with the rotating shaft of the pulley 126b. The supporting shafts 105a, 105b of the said burner rocking mechanism fit the burner rocking mechanism, together with a rack shaft 111, properly in place on the reinforcing bar supporting device 101, in such a manner as is shown in FIG. 9. $SET_1$ and $SET_2$ shown in FIG. 6 are dials, whereof the former controls the variable resistor $VR_7$ shown in FIG. 13, to thus conduct setting of the position of the ram. To put it otherwise, the output signal of the potentiometer $POT_3$ corresponding to the position of the movable chuck 104b shown in FIG. 7 and the signal of the setter $VR_7$ are added to each other by the employment of an adding machine Ao, at the time of conducting preliminary pressing, prior to heating, to thus set the variable resistor $VR_7$ as a setter in such a manner that the indicating meter MT indicates the value of 0, and to thus cause only the amount of contraction of the reinforcing steel bars in the course of the pressure welding process to be detected in a proper manner. The latter, or $SET_2$, on the part thereof, controls the variable resistor $VR_6$, to thus conduct setting of the position of the burner, for setting the burner properly in place at the butted surface of the reinforcing steel bars.

In the circuit diagrams of FIG. 12 and FIG. 13, SW represents a power source switch, $PB_1$ - $PB_8$ represent pushbutton switches, $RY_1$ - $RY_{14}$ are various relays, and $T_{y1}$, $T_{y2}$ represent a delay relay. The contacts thereof has the symbol of A attached to an ever-open contact, the symbol of B attached to an ever-closed contact, and a digit of 1, 2, 3 and so forth further attached thereto, in a manner of corresponding to the relays. $POT_1$ - $POT_5$ represent potentiometers, $VR_1$ - $VR_{12}$ represent variable resistors for conducting setting of various data, DR represents a data recorder, and $CH_1$ — $CH_4$ represent the channel 1 through the channel 4 thereof. $A_0$ is an adding machine, $A_1$ is a servo amplifier, which receives the reproduced output from the potentiometers $POT_1$ - $POT_3$, the variable resistors $VR_6$, $VR_7$, and the channel 1 $CH_1$ of the data recorder, to thus conduct control of the motor M$_3$. A$_2$ - A$_6$ are comparators, and the blank symbol of triangle (Δ) borne by the side of the inputs thereof represents a common line.

Next, given below will be a description of the operation of this system, by starting with a programming mode in the case wherein a joystick (an apparatus whereof a potentiometer, a differential transformer, such a position signal generator as a pulse generator, or a switch is manually operated by a person through a lever or the like, to thus generate an instruction signal) is specifically employed. The fixed chuck 104a and the movable chuck 104b of the reinforcing steel bar supporting device 101 are caused to hold the reinforcing steel bars 113a, 113b in the state of their being butted, and the burner driving mechanism 130 is fitted in place in the reinforcing steel bar supporting device 101. As shown in FIG. 7 and FIG. 9, this is to be conducted by inserting a pair of cones 106a, 106b at the top of the shafts 105a, 105b fixed in place on the burner driving mechanism 130 properly in place into the conical holes 108a, 108b of the mounting plate 107 of the reinforcing steel bar supporting device 101, by operating the handle 109, to thus cause the pinion 110 to be rotated, by causing the rack shaft 111 to advance forward, to thus insert a crank pin 112 positioned at the top of the said rack shaft 111 properly in place into the lower side of the said mounting plate 107, and by holding the said mounting plate 107 properly in place between the said crank pin 112 and the said pair of cones 106a, 106b. Then, the top of such a wire cable 128 for detecting the position of the ram as is drawn out of the burner driving mechanism 130 is fitted in place on the reinforcing steel bar supporting device 101 by way of a quick coupling 129. In the wake thereof, a push is given on the push-button switch PB$_5$ shown in FIG. 12, to thus energize the relay Ry$_5$, the contact Ry5A$_1$ is closed for self-retaining, the contact Ry5A$_2$ is also closed for starting up the motor M$_2$ of the oil pressure pump, the oil presure pump 103 for pressing is driven, to thus feed the oil pressure ram 102 with pressurized oil, and the reinforcing steel bar 113b is pressed against the reinforcing steel bar 113a, to thus conduct preliminary pressing. The push-button PB$_6$ is pushed at the time of having confirmed by an oil pressure gage 114 that the output oil pressure of the oil pressure pump has risen up to the level of a designated value, and the relay Ry$_5$ is deenergized, to thus suspend the operation of the oil pressure pump 103. The ram position setter VR$_7$ is adjusted at this time, and the indication on the ram position indicating meter MT is set at the position of 0.

Next, the mode change-over switch MOSW is switched over to R on the side of the program, the relay Ry-13 is energized, the ever-open contacts Ry-13A$_1$ - Ry-13A$_6$ are closed, the ever-closed contacts Ry-13B$_1$ -Ry-13B$_3$ are opened, and the input signal change-over switch SW-1 is set on the side of P, to thus select the signal of POT$_1$. And, the push-button switch PB$_1$ is pushed, to thus energize the relay RY-1, the contact Ry-1A$_1$ is closed for self-retention, the contact Ry-1A$_2$ is closed, to thus open the electromagnetic valve SO$_1$ for oxygen for the use of heating and the electromagnetic valve SO$_2$ for acetylene gas for the use of heating, and the rocking motor M$_1$ of the burner is energized and started up, to thus put the eccentric cam 115 shown in FIG. 5 to rotation in a proper manner. Now that this eccentric cam is in contact with such miniature rollers 119, 120 as are fitted in place on the rocking piece 118, the said rocking piece 118 rocks in the longitudinal directions in parallel with the shaft 105a and so forth.

The throttle valve N$_1$ for oxygen and the throttle valve N$_2$ for acetylene gas for the use of heating are opened more or less at this time, to thus conduct ignition thereof, and then the said valves N$_1$, N$_2$ are properly adjusted in such a manner that the heating flame reaches the optimum level. In the wake thereof, the push-button PB$_3$ is pressed, to thus energize the relay Ry-3, the contact Ry-3A$_1$ is closed for self-retention, the contact Ry-3A$_2$ is closed, to thus open the electromagnetic valve SO$_3$ for acetylene gas for reduction is opened, and the throttle valve N$_3$ thereof is properly adjusted in such a manner that the flame of the burner 121 reaches the optimum level of the reducing flame. This is quite important for keeping the butt end surface of the reinforcing steel bars free from being subjected to oxidation. In this state, the gas burner 121 is caused to advance in a manner of encompassing the butted portion of the reinforcing steel bars, the gas burner 121 is caused to move rightward or leftward by means of the burner position setter VR$_6$, until the gas burner 121 conforms with the reinforcing steel bars in terms of the joining surface thereof.

In the wake thereof, the memory switch MS of the data recorder DR is set at the position of ON, and the playing button PS and the recording button RS are pressed ON concurrently, then recording is started. In this case, the set voltage (for instance, −8V) of the voltage setter VR$_2$ is recorded as ON signals of oxygen for heating, acetylene for heating and reduction, and the rocking motor M$_1$, on the channel 2 CH$_2$ of the data recorder, by way of the contacts RY-13A$_3$ and RY-3A$_3$. The operator controls the amplitude of the burner 121 and the speed of travel thereof as desired by pushing the lever 122 shown in FIG. 5 in the horizontal directions, to thus controlling the potentiometer POT$_1$.

To put it otherwise, in this case the shaft 123 of the slider of the potentiometer POT$_1$ is retained at the zero point by the springs 124a, 124b, in the state of being influenced by no external force. When an operator pushes the lever 122 either in the rightward direction or in the leftward direction under such a state as is set forth above, the shaft 123 of the potentiometer POT$_1$ is subjected to displacement in proportion to the force applied to push the said lever 122, and a voltage signal proportionate to the said displacement is generated in the form of an output. The said voltage signal is fed, as an input, to the data recorder, by way of the contact Ry-13A$_1$, recorded in the channel 1 CH$_1$ as a control signal for the direct-current motor M$_3$ for driving the burner, and is fed to the amplifier A$_1$ as an input, to thus drive the said motor M$_3$, puts the pulley 126a to rotation by way of the reduction gear 125, conducts feeding of such a timing belt 127 as is engaged with the said pulley, and causes such a slide block 116 as is fixed in place on the said belt to travel either in the rightward direction or in the leftward direction. This travel is transmitted to the potentiometer POT$_2$ by way of such a pulley 126b as is rotated by the said timing belt 127, is detected by the said potentiometer, and is fed back to the input of the amplifier A$_1$. As a result thereof, the burner 121 travels in a following manner to such a position as is designated by the lever 122, the speed of this travel is corresponding to the speed of travel of the lever 122, and the range and the speed of these travels are all recorded in the data recorder.

An operator, while watching the state of heating the reinforcing steel bars, will press the push-button $PB_5$ at such time as is deemed proper therefor, and will excite the relay Ry-5. The relay Ry-5 closes the contact Ry-$5A_1$ for self-retention, concurrently closes the contact Ry-$5A_2$, to thus energize the oil pump motor $M_2$ for pressing, and to press the reinforcing steel bars. Furthermore, the relay X is actuated concurrently, the set voltage (for instance, $-4V$) of the voltage setter $VR_3$ is caused to be applied on the channel 3 $CH_3$, by the contact X-1 of the said relay, only while the push-button $PB_5$ is kept pushed ON, thereby is recorded on the said channel as the ON signal for the motor $M_2$ of the oil pump for pressing.

When the reinforcing steel bars are completely joined, and the preset level of contraction $\delta_2$ is reached, the relay Ry-1 in FIG. 4 will be energized the break contact Y-1 will be opened, and the motor $M_2$ for the pressing motor will be stopped. In the wake thereof, the push-button $PB_4$ will be pushed, to thus deenergize the relay Ry-3, the contact Ry-$3A_2$ will be employed for deenergizing the electromagnetic valve $SO_3$ for acetylene gas for reduction, and the flame of the burner will be rendered from a reducing flame to a neutral heating flame. Now that, at this time, the contact Ry-$3A_3$ is also opened OFF, recording of the said ON signals for oxygen for the use of heating into the channel 2 $CH_2$ is suspended, and the contact Ry-$3B_1$ is closed instead, therefore, the set voltage (for instance, $-4V$) of the voltage setter $VR_1$ is recorded in the channel 2 $CH_2$, in the form of signals of oxygen for heating, acetylene for heating, and the rocking motor $M_1$ ON.

The operator will pass judgement on the bases of the heating temperature, the heating range and the like, to thus press the push-button $PB_3$ once again, actuate the motor $M_2$ of the pump for pressing, and subject the reinforcing steel bars to pressing. Now that the reinforcing bars are heated up to a level of high temperature, the vicinity of the joining portion thereof is bulged and the length of the said joining portion is subjected to contraction. When the amount of this contraction reaches the preset level of the amount of contraction of $\delta_3$, the electromagnetic valves $SO_1$, $SO_2$ for oxygen and acetylene for the use of heating are closed, and, in the wake thereof, when the level of the amount of contraction reaches $\delta_4$, the pressurizing pump $M_2$ is suspended. The said amount of contraction is to be learned by the movement of the movable chuck 104b of the reinforcing steel bar supporting device 1, the value thereof is to be detected by the potentiometer $POT_3$ by way of a wire cable 128, and the output voltage of the said potentiometer is fed to the adding machine $A_0$ as an input. The adding machine $A_0$ conducts operation to reckon one half of the amount of contraction, feeds the amplifier $A_1$ with the value thus reckoned as an input, to thus put in revolution the driving motor $M_3$ for the burner, and the gas burner 123 is caused to travel in the traveling direction of the movable chuck 104b by as much as one half of the amount of contraction. Thereby the center of the horizontal reciprocating motion of the burner has the position modified in an automatic manner in such a manner as to be above the joining portion of the reinforcing steel bars at all time, to thus make it unnecessary for the operator to exercise special attention to the movement of the joining surface due to the amount of contraction of the reinforcing steel bars.

In the wake thereof, the push-button $PB_2$ is pressed, to thus deenergize the relay Ry-1, open the contacts Ry-$1A_1$, Ry-$1A_2$, close the electromagnetic valves $SO_1$, $SO_2$ for oxygen and acetylene gas for the use of heating, respectively, and stop the burner rocking motor $M_1$. Furthermore, the push-button $PB_7$ is pressed, to thus energize the relay Ry-7, actuate the electromagnetic check valve $SO_4$ for release of oil pressure, and to thus release the oil pressure. Now that this operation is completed within a short while, no self-retaining circuit is specifically required therefor. When the relay Ry-7 is thus energized, the contact Ry-$7A_2$ is also closed, whereby the set voltage (for instance, $+4V$) of the voltage setter $VR_4$ is recorded in the channel 3 $CH_3$ of the data recorder DR, as the ON signal for the electromagnetic check valve $SO_4$. Then, the push-button $PB_8$ is pressed, to thus energize the relay Ry-9. The relay Ry-9 closes the contract Ry-$9A_1$ for self-retention, closes the contact Ry-$9A_2$, to thus energize the timer Ty-1, and closes the contact Ry-$9A_3$, to thus record the set voltage (for instance, $-4V$) of the voltage setter $VR_5$, as the pressure welding completion signal, in the channel 4 $CH_4$ of the data recorder.

When the set time is reached, the timer Ty-1 closes the contacts Ty-1A, to thus energize the relay Ry-10. The relay Ry-10 closes the contact Ry-$10A_1$ for self-retention, concurrently closes the contact Ry-$10A_2$, to thus feed the data recorder DR with a stop signal STP, and stops the data recording action. When the contact Ty-1A is closed, the timer $Ty_2$ is also energized, and, after a quite short time, the contact Ty-2A is closed, to thus cause the relay Ry-12 to be energized. The relay Ry-12 closes the contact Ry-$12A_1$ for self-retention, also closes the contact Ry-$12A_2$, to thus feed the data recorder DR with a rewinding signal RWD, for conducting rewinding of a tape. Furthermore, the relay Ry-12 opens the contacts Ry-$12B_1$, Ry-$12B_2$, to thus deenergize the relays Ry-9, Ry-10, also deenergize the timers Ty-1, Ty-2.

When the rewinding of the tape progresses, and reaches the memory counter setting position for startup of recording, the memory counter mechanism is actuated, and the tape-rewinding action is completed. Furthermore, the ever-closed contact of the memory counter MEC is opened, to thus deenergize the relay Ry-12, whereby the whole programming is completed. Shown in FIG. 10 are waveforms of the signals recorded in the channels $CH_1$ - $CH_4$ of a data recorded in such a manner as set forth above. Given below will be a description of the case of recording the amplitude and the speed of the burner by the employment of a burner amplitude signal generator. The burner amplitude setter is so designed as to be capable of changing over the amplitude and the speed thereof step by step, hence capable of setting any optional amplitude and speed at each step. By setting the signal change-over switch SW-1 on the side of G, and making selection of a proper signal for the burner amplitude signal generator, an operator conducts pressure welding while making selection of the amplitude and the speed preset for each step, and the amplitude and the speed thus selected are recorded on a magnetic tape in a concurrent manner.

Next, a description will be given with regard to the reproduction mode.

The mode change-over switch MOSW is changed over to the side of play P, and the relay Ry-13 is deenergized. The manual operation for fitting reinforcing steel bars in place on the reinforcing steel bar supporting device 101 is to be conducted in the same manner as in the case of the programming mentioned above. To put it in concrete terms, the push-button $PB_1$ is pressed, the relay Ry-1 is thus energized, the electromagnetic valve $SO_1$ for oxygen for the use of heating, the electromagnetic valve $SO_2$ for acetylene gas for the use of heating, and the burner rocking motor $M_1$ are actuated, to thus ignite the burner, the push-button $PB_3$ is pressed, to thus open the electromagnetic valve $SO_3$ for acetylene gas for the use of a reducing flame, the flame is subjected to proper control, the indicating meter MT is set at the position of 0 by the setter $VR_7$, the burner is inserted in place at the heating position, the burner position setter $VR_6$ is controlled, to thus properly position the burner 121 to conform with the joining surface of the reinforcing steel bars, the play button PS of the data recorder is pressed, and reproduction is conducted. In the case of the programming mode, the input voltage from the potentiometer $POT_1$ is fed as an output from the channel 1 $CH_1$ of the data recorder, is fed as an input to the amplifier $A_1$ by way of the ever-closed contact Ry-$13B_1$ of the relay Ry-13, and the gas burner driving motor $M_3$, hence the burner 121, conducts exactly the same motion as in the case of programming.

Such an ON signal (-8V) as is fed as an input by the voltage setter $VR_2$ at the time of programming is first fed out of the channel 2 $CH_2$, and is applied on the comparators $A_2$, $A_3$ by way of the contact Ry-$13B_2$. Now that the set voltage of the voltage setters $VR_8$, $VR_9$ is so set as to be 3V, 7V, respectively, the comparators $A_2$, $A_3$ generate a positive output, which energizes the relays $Ry_2$, $Ry_4$ by way of the diodes $D_2$, $D_3$. The relay Ry-2 closes the contacts Ry-$2A_1$, Ry-$2A_2$, and the relay Ry-4 closes the contact Ry-$4A_1$. Thereby the electromagnetic valve $SO_1$ for oxygen for the use of heating, the electromagnetic valve $SO_2$ for acetylene gas for the use of heating, the motor $M_1$ for the rocking of the burner, and the electromagnetic valve $SO_3$ for acetylene gas for the use of reduction are energized, respectively, and heating of the joining portion of the reinforcing steel bars is conducted by the reducing flame, accompanied with the rocking of the burner. Besides, the relay Ry-14 is energized, the contact Ry-$14A_1$ is closed for self-retention, and the contacts Ry-$14B_1$ -Ry-$14B_5$ are opened, to thus cut off the circuit for manual operation.

When the tape advances, the set voltage (-4V) written in as a signal for pressing the reinforcing steel bars from in the channel 3 $CH_3$ is fed out as an output soon thereafter, and the voltage thus fed out as an output is fed as an input to the comparators $A_4$, $A_5$ by way of the contact Ry-$13B_5$. Now that the standard voltage of the said comparators is so set as to be (+3V), (-3V) by the voltage setters $VR_{10}$, $VR_{11}$, respectively, the comparator $A_4$ generates a positive output and energizes the relay Ry-6 by way of the diode $D_4$. The relay Ry-6 closes the contact Ry-$6A_1$, energizes the relay Ry-5, start-up the motor $M_2$ of the oil pump, and causes the reinforcing bars to be pressed. When the level of the preset amount of contraction is reached, the relay Y is energized, the contact Y-1 thereof is opened, the relay Ry-5 is deenergized, and the motor $M_2$ for the pump is stopped. The comparator $A_5$, on its part, too, generates a positive output, which, however, is inhibited by the diode $D_5$, and the relay Ry-8 is checked from being actuated. Then, the output of the channel 2 $CH_2$ is formed into such an ON signal (-4V) as indicates the heating of the heating flame, the output of the comparator $A_3$ is so reversed as to be negative, the relay Ry-4 is inhibited by the diode $D_3$, to thus deenergize the relay Ry-4, the contact Ry-$4A_1$ thereof is opened, the electromagnetic valve $SO_3$ for acetylene gas for the use of reduction is closed, and the flame of the burner is rendered into a heating flame.

In the wake thereof, a pressing signal (-4V) is generated, as an output, from in the channel 3 $CH_3$ once more, the comparator $A_4$ generates a positive output, to thus energize the relay Ry-6, the contact Ry-$6A_1$ is closed, to thus start up the motor $M_2$ of the pump, and the reinforcing steel bars are pressed by the ram 102. The amount of contraction of the reinforcing steel bars is detected at all time by the potentiometer $POT_3$ designed for detecting the position of the ram, in the same manner as in the case of the programming mode, one half of the amount of contraction is reckoned out by the operating device $A_0$, and the value thus obtained is applied on the amplifier $A_1$ and corrected automatically by the burner driving motor $M_3$. Thereafter the pressing signal (-4V) is reduced to the level of 0V, the output of the comparator $A_4$ is rendered negative in terms of the value thereof, to thus deenergize the relay Ry-6, and the motor $M_2$ of the oil pump is stopped. Thereafter, a signal (+4V) for release of oil pressure is generated, as an output, from in the channel 3 $CH_3$, and is applied on the comparators $A_4$, $A_5$. The comparator $A_4$ generates a negative output, which is inhibited by the diode $D_3$, and the relay Ry-6 is kept free from being actuated. The output of the comparator $A_5$ is so reversed as to be negative, the relay Ry-8 is energized, to thus close the contact Ry-$8A_1$, and the electromagnetic valve $SO_4$ is actuated, to thus release the oil pressure. When the signal (+4V) for release of the oil pressure is reduced to the level of 0, the relay Ry-8 is de-energized, the contact Ry-$8A_1$ is opened, and the contact Ry-$8A_1$ is opened, then the electromagnetic check valve $SO_4$ is closed.

In the wake thereof, a pressure welding completion signal (-4V) is generated from in the channel 4 $CH_4$, the output of the comparator $A_6$ is so reversed as to be positive, to thus energize the relay Ry-11. As the result thereof, the contact Ry-$11A_1$ is closed, the relay Ry-10 is energized, the contact Ry-$10A_2$ is closed, and a recorder stop signal STP is generated and transmitted to the data recorder DR. Furthermore, the timer Ty-2 is also energized, the contact Ty-2A is closed only a short while thereafter, and the relay Ry-12 is energized. The relay Ry-12 closes the contact Ry-$12A_1$ for self-retention, and closes the contact Ry-$12A_2$, whereby a rewinding signal RWD is transmitted to the data recorder DR, to thus cause a tape to be subjected to rewinding. The data recorder DR is caused to stop automatically, by a memory counter mechanism, at the set position of the memory counter, to put it otherwise, at the automatic pressure welding process starting position, the contact of the memory counter MEC is opened at the same time, and the relay Ry-12 is deenergized, to be thus prepared for the subsequent pressure welding process.

Now the reproduction mode is completed in its entirely, and automatic gas pressure welding comprising exactly the same processes as the pressure welding processes to be conducted by a skillful operator can be said to have been conducted. The said series of processes are conducted in a repeated manner, whereby reinforcing steel bars are subjected to pressure welding in a sequential manner. When the classification and/or the size of the reinforcing steel bars to be thus subjected to pressure welding do/does not remain the same, hence impracticable to apply the same pressure welding processes, the magnetic tape according to which a skillful operator has so far conducted pressure welding, or on which the preceding processes of pressure welding have been recorded, with regard to the classification and/or the size of the reinforcing steel bars is replaced with an appropriate one for proper operation. It goes without saying that a skillful operator may newly conduct pressure welding and recording on a tape for reproduction.

In the case of the embodiment described above, the gas pressure welding processes conducted by a skillful operator can be recorded by the employment of a comparatively simple device, and automatic gas pressure welding can be conducted in conformity with the record thus prepared. When a cassette-type tape is selected, a reasonably good number of said gas pressure welding processes can be kept in record and made available for long in a proper manner. On the basis of the record thus kept in a cassette-type tape, such gas pressure welding as best possibly suits the environments of pressure welding, as well as the classification and the size of the reinforcing steel bars to be subjected to pressure welding, is made practicable.

What we claim is:

1. An automatic gas pressure welding system comprising:
    means for causing the ends of a couple of steel bars to be butted to each other by pressing of said steel bars;
    means for heating the vicinity of the butted portion of said steel bars;
    means for controlling the action of said pressing means and that of said heating means; said control means comprises the following items:
    means for detecting that the amount of contraction of said bars has reached a preset value of $\delta_2$ and thereafter stopping a primary pressing action of said pressing means, provided that a designated time has elasped.
    means for starting a secondary pressing stage in the wake of the stop of the pressing by said pressing means;
    means for stopping heating by said heating means, when the amount of contraction of said steel bars reaches the preset value of $\delta_3$ while the pressure continues to provide a tertiary pressing action; and
    means for stopping the tertiary pressing action of said pressing means, when the amount of contraction of said steel bars reaches the preset value of $\delta_4$.

2. The system set forth in claim 1 wherein said heating means includes a gas burner and a driving means therefor.

3. The system set forth in claim 2 wherein said gas burner is, a multinozzle ring burner.

4. The system set forth in claim 2 wherein said driving means includes means for causing said gas burner to reciprocate in the axial directions of said steel bars and to rock in the rectangular direction thereto.

5. The system set forth in claim 4 wherein said pressing means includes a supporting device for supporting said steel bars, said supporting device is provided with a couple of grip heads, of which one is of the fixed type and the other is of the movable type, said movable-type head is connected with a searching rod for detecting changes in the movement thereof, and the amount of contraction of said steel bars is transmitted to said control means.

6. A system set forth in claim 5 wherein said gas burner and said driving means are fitted in place en masse on said steel bars by way of said supporting device.

7. The system set forth in claim 5 wherein said pressing means includes an electromotive oil pump, said pump generates oil pressure at the time designated by a program, means for causing the grip head to move on the movable side of said supporting device, to thereby cause said steel bars to be pressed in conformity with a control instruction given by said control means.

8. The system set forth in claim 7 wherein said control means comprises means jointly responsive to a sequential control system operated by a designated program and a feedback control system operated by the amount of contraction of said steel bars.

9. The system set forth in claim 8 wherein said control means includes a magnetic recording means and a reproduction means, pressure welding processes by a skilled operator are recorded on a magnetic tape, the tape is reproduced, whereby a control instruction is obtained, and pressure welding is controlled in conformity with said control instruction.

* * * * *